United States Patent Office 3,408,296
Patented Oct. 29, 1968

3,408,296
LOW LIQUID LOSS COMPOSITION
David A. Kuhn and Jack L. Brown, Ponca City, Okla., assignors to Continental Oil Company, Ponca City, Okla., a corporation of Delaware
No Drawing. Filed Jan. 25, 1965, Ser. No. 427,956
14 Claims. (Cl. 252—8.55)

This invention relates to an improved composition and method useful in hydraulically fracturing a subterranean formation. More particularly, this invention relates to a dry composition useful as a fluid loss control additive for aqueous-base fracturing fluids and to a method of fracturing a well therewith to increase the permeability to fluids of the formation surrounding the well.

It is oftentimes desirable to increase the rate of flow of fluids into or out of subterranean reservoirs such as during flooding operations or production of well fluids. One means of increasing such rate of fluid flow is by fracturing the subterranean formations. A popular method of fracturing is hydraulic fracturing in which a fluid, called the fracturing fluid, is pumped into a well into contact with the formation at a pressure sufficient to lift the overburden and part or fracture the formation. After the initial breakdown of the formation has occurred, a propping agent is generally added to the stream of fracturing fluid being pumped into the well to extend the fracture. Propping agents are solid particles, such as sand, walnut shells, glass beads, aluminum pellets, plastic and the like, which are partially deposited in the fracture and prop the fracture open at the completion of the treatment, thus enhancing the flow of fluids through the fracture.

Due to their ready availability and economic advantages, aqueous- base fracturing fluids are widely used. Such fluids may take various forms such as fresh water, brine, acid, gelled water, gelled brine and gelled acid.

One of the more important characteristics of a fracturing fluid is its fluid loss or leak off. In order to build up the high pressures necessary to initiate and extend the fracture, it is necessary that the fracturing fluid penetrate and leak off into the formation to as limited an extent as possible. Also, a fracturing fluid having a low fluid loss is an efficient fluid in that a greater portion of each volume of such a fluid is utilized in enlarging the fracture area, and fluid leaking off into the formation which fails to contribute to fracture extension is minimized. Various additives are known which help control this fluid loss. These additives are generally finely divided solids which tend to plate out, temporarily plug and plaster the faces of the formation exposed to the fracturing fluid, thus sharply decreasing the flow of fluids out into the formation. Although progress has been made in controlling penetration of fracturing fluids through the use of such additaments, there is still appreciable loss experienced upon the use of fracturing fluids containing known fluids loss additives. It has been the experience that a particular additive which might give good leak off control in one type of aqueous media will be relatively ineffective in another type. For example, one additive may be satisfactory in fresh water but give poor results in brine, while another additive may operate fine in either fresh water or brine but give little penetration control in gelled aqueous media. There still exists a need for an improved fluid loss control additive for use in all aqueous-base fracturing media.

An important object of this invention is to provide a fracturing liquid composition having low liquid loss characteristics. A further object is to provide a low liquid loss additive which can be used in any and all aqueous base fracturing compositions. A still further object is to provide a low fluid loss additive which is especially effective in gelled aqueous base fracturing compositions. Various other objects, advantages and features of the invention will become apparent from the following detailed description.

The objects of this invention are attained by conducting hydraulic fracturing operations in subterranean reservoirs traversed by well bores with a novel water base fracturing composition. The hydraulic fracturing is accomplished with a major portion of water, particularly gelled water, as a carrier and a minor portion of an additive comprising a primary plugging agent, a secondary plugging agent, and a tertiary plugging agent, all in sufficient quantities ratios to provide suitable liquid loss chrcteristics for the and ratios to provide suitable liquid loss characteristics for the aqueous base fracturing fluid. This invention is directed to the dry additive per se, the fracturing fluid composition containing the additive and the process of utilizing the composition in a hydraulic fracturing operation. In a preferred embodiment of the invention for use in ungelled water or brine, the fluid loss control additive contains a polymeric material as a fourth ingredient.

The water used as the carrier or vehicle for the water base fracturing composition of this invention may be substantially any water, such as that available at the site of well wherein the hydraulic fracturing operation is to be conducted. The use of available water from surface storage or wells eliminates the necessity of transporting specially treated water to the site or treating the available water in some special manner. Therefore, the carrier water can be fresh water, water containing traces of foreign material or brines. These brines may conveniently be those from the well being fractured.

The primary plugging agent may be any low density solid silicate material having a configuration in which two of the dimensions of each particle are substantially greater than the third dimension. The surfaces of these particles may be flat or may have some curvature and may be described generally as being essentially flat, planar, homaloidal or arculate in character. Thus, the particles have a high surface-to-volume ratio. One example of such a material is perlite, a volcanic lava composed mostly of aluminum silicates which is processed into the form of small hollow glassy shells by sintering in a furnace to change the water of crystallization to steam and thus expand the ore in a manner similar to the manufacture of edible puffed cereals. This expansion breaks up the shells producing a profusion of arcuate-shaped particles. Another suitable material of this class is diatomaceous earth, a hydrous opaline form of silica having an essentially flat surface. Still another primary plugging agent is talc. Yet another is Microcel, a synthetic, finely-divided calcium silicate mineral. By low density is meant those materials having a bulk density from about 8 to about 18 pounds per cubic foot. For example, the bulk density of diatomaceous earth and perlite is 16 and from 10 to 13 pounds per cubic foot, respectively.

The secondary plugging agent of the subject water base fracturing liquid is any starch, but preferably cold water dispersible starches which do not require boiling. The starches requiring boiling and those starches chemically modified for particular properties are entirely satisfactory providing the circumstances of use are compatible for each operation. Among the operable starches are those derived from corn, potatoes, wheat and the like.

The tertiary plugging agent of the fracturing liquid is a clay which swells when dispersed in water. Examples of suitable clays are montmorillonite and illite. Especially suitable is Wyoming bentonite, a sodium-base montmorillonite widely used in drilling fluids.

The polymeric material which is added as a fourth ingredient if the fluid loss control additive is to be used in ungelled fresh water or brine may be any of the water-soluble natural and synthetic gums. Operable natural gums include guar, dextran, karaya, locust bean, arabic, algin and tragacanth gums. Especially useful is guar gum which is essentially a straight-chain polymer of mannose units linked in a 1-4 betaglucosidic linkage and having galactose branching on alternate mannose units. Polymeric materials or synthetic gums useful include polymers of acrylamide, ethylene oxide or a monoalkenylaromatic sulfonate. Polyarcylamide is obtained by well known polymerization procedures under the influence of a catalyst such as benzoyl peroxide. The polymers may be used as obtained after polymerization or partially hydrolyzed by the reaction of the polymer with a sufficient amount of a base, such as sodium hydroxide, to hydrolyze a portion of the amide groups present in the polymer molecule. The ethylene oxide polymers which are effective are those characterized by a minimum of cross-linkages and high molecular weights of from about 1 to about 10 million. Suitable polymers of monoalkenylaromatic sulfonates include linear high molecular weight polymers of styrene-sulfonic acids and the various substituted styrene-sulfonic acids.

The various components of the instant fluid loss additive are operable over a wide variety of concentrations. The lower limit of each ingredient is the minimum amount which will impart acceptable fluid loss control to the system. The upper limit is not as critical, being the amount above which little additional fluid loss control is achieved. Amounts in excess of the suggested upper limit are not particularly harmful, but rather just not necessary. Table I below gives the suggested limits of each constituent of the fluid loss additive.

TABLE I

| Additive Component | Suggested Concentration in Fluid Loss Additive (Parts by Weight) | |
| --- | --- | --- |
|  | Minimum | Maximum |
| Primary plugging agent | 100 | 150 |
| Secondary plugging agent | 250 | 350 |
| Tertiary plugging agent | 125 | 175 |
| Polymeric agent (if present) | 0 | 100 |

An especially effective combination has been found to be one comprising 125 parts by weight perlite, 300 parts starch, 150 parts bentonite and 50 parts guar gum. The total concentration of the additive combination used in aqueous media is generally from 5 to 200 pounds per 1000 gallons.

The additives may be added separately to the aqueous base fracturing fluid. However, it is more convenient that they be mixed together at a central location in any desired order to form a solid particulate homogeneous mixture which exhibits little tendency to separate upon standing. The mixture can then be transported to the well site and dispersed into the aqueous fracturing media with a minimum of agitation.

It is not considered that particle size of the various components or final additive mixture is of critical importance. Each of the materials may be used as purchased in particulate form through ordinary commercial channels with no special grinding or milling required. A particle size distribution made on a typical perlite sample showed 15.1 percent above 10 microns, 38.6 percent above 5 microns, 58.0 percent above 2.5 microns, 89.1 percent above 1 micron and 99.0 percent above 0.5 micron.

It is oftentimes desirable to increase the viscosity of either fresh water or brine which is to be used as a fracturing fluid in order to improve the propping agent-carrying properties. This is especially true when high density propping agents are to be employed. The viscosity of water may be increased by adding thereto any of the large number of known water thickeners, such as water-soluble natural and synthetic gums, cellulose derivatives, or polymeric materials. Operable gums include those species listed above as polymeric materials which serve as the fourth ingredient of the fluid loss control additive, i.e., guar, dextran, karaya, locust bean, arabic, algin and tragacanth, as well as polymers of acrylamide, ethylene oxide or a monoalkenylaromatic sulfonate. Guar gum is especially effective. Among the cellulose derivatives which can be used to thicken water are various cellulose esters, ethers, and ether salts such as sodium carboxymethyl cellulose, ethyl cellulose and hydroxyethyl cellulose.

A series of tests were made in accordance with A.P.I. R.P. 39, "Recommended Practice Standard Procedure for the Evaluation of Hydraulic Fracturing Fluids," Section V, Fluid Loss, with the exception that the filter medium was three thicknesses of Whatman No. 50 filter paper, rather than only one such filter paper, and filtration loss in milliliters was measured after 30 minutes. All tests were made at 1000 p.s.i. and 125° F. These tests, summarized in Table II, show the effect of the fluid loss control additive mixture in fresh water and gelled water containing 40 pounds per 1000 gallons guar gum. The total concentration of fluid loss additive mixture as well as the ratio between ingredients was held constant. A synergistic effect was noted among the four constituents of the additive mixture. Preliminary tests not shown established that each constituent used along and combinations of two ingredients impart limited fluid loss control in the system. However, it was only when all four ingredients were used together that exceptionally low fluid loss was achieved with all aqueous media. The tests of Table II show that in fresh water addition of a primary plugging agent to the fluid loss additive mixture does not improve the fluid loss control. However, the tests in gelled water show a sharp decrease in fluid loss if a primary plugging agent is present. Thus, in compounding a single fluid loss additive which may be used in all aqueous base media, the presence of a primary plugging agent is essential. The tests also show the necessity of a secondary and a tertiary plugging agent in both fresh water and gelled water. With gelled water, it is not necessary that the fluid loss additive contain a polymeric agent. However, guar gum in the additive is not harmful when used in gelled water and allows formulation of a single additive useful in all aqueous media. Thus, one universally applicable additive may conveniently be prepared at central manufacturing locations and distributed to all wells within a given area, thereby avoiding the necessity of field blending of the additive or use of several variations of the additive in different aqueous fracturing fluids. Example 6 illustrates that the fluid loss additive of this invention is operable in dilute mineral acid.

TABLE II

| Example | Aqueous Media | Primary Plugging Agent Perlite (lbs./ 1,000 gal.) | Secondary Plugging Agent Starch (lbs./ 1,000 gal.) | Tertiary Plugging Agent Bentonite (lbs./ 1,000 gal.) | Polymeric Agent Guar Gum (lbs./ 1,000 gal.) | Total Additive Concentrate (lbs./ 1,000 gal.) | Fluid Loss (ml./30 min.) |
| --- | --- | --- | --- | --- | --- | --- | --- |
| 1 | Fresh water | None | 30.0 | 15.0 | 5.0 | 50.0 | 17.0 |
| 2 | do | 19.3 | None | 23.1 | 7.6 | 50.0 | 41.8 |
| 3 | do | 13.2 | 31.6 | None | 5.2 | 50.0 | 27.0 |
| 4 | do | 10.9 | 26.1 | 13.0 | None | 50.0 | 21.0 |
| 5 | do | 10.0 | 24.0 | 12.0 | 4.0 | 50.0 | 17.6 |
| 6 | 3% hydrochloric acid [1] | 10.0 | 24.0 | 12.0 | 4.0 | 50.0 | 16.9 |
| 7 | Gelled water [2] | None | 30.0 | 15.0 | 5.0 | 50.0 | 23.3 |
| 8 | do.[2] | 19.3 | None | 23.1 | 7.6 | 50.0 | 13.5 |
| 9 | do.[2] | 13.2 | 31.6 | None | 5.2 | 50.0 | 14.0 |
| 10 | do.[2] | 10.9 | 26.1 | 13.0 | None | 50.0 | 16.0 |
| 11 | do.[2] | 10.0 | 24.0 | 12.0 | 4.0 | 50.0 | 13.2 |

[1] Contained 0.5% sodium arsenite as corrosion inhibitor.
[2] Fresh water containing 40 lbs./1,000 gallons guar gum.

Another group of tests shown in Table III was made following the above-described procedures to show the effectiveness of the additive in brine and gelled brine. The fluid loss additive was composed of 57 parts by weight perlite, 125 parts starch, 29 parts bentonte and 29 parts guar gum and is hereinafter referred to as Additive A. Good filtration loss control was achieved at concentrations of additive as low as 20 pounds per 1000 gallons in both sodium chloride and calcium chloride brines.

TABLE III

| Example | Aqueous Media | Concentrated Additive A (lbs./1,000 gal.) | Fluid Loss (cc./30 min.) |
|---|---|---|---|
| 12 | 5% sodium chloride brine | 100 | 10.9 |
| 13 | do | 40 | 21.3 |
| 14 | do | 30 | 24.2 |
| 15 | do | 20 | 27.2 |
| 16 | do | 10 | 41.9 |
| 17 | 5% sodium chloride brine gelled with 40 lbs. per 1,000 gal. guar gum. | 50 | 12.8 |
| 18 | Saturated sodium chloride brine. | 100 | 10.4 |
| 19 | do | 50 | 16.3 |
| 20 | do | 100 | 12.0 |
| 21 | do | 40 | 21.8 |
| 22 | do | 30 | 24.8 |
| 23 | do | 20 | 35.0 |
| 24 | do | 10 | 54.0 |
| 25 | 1% calcium chloride brine gelled with 40 lbs. per 1,000 gals. guar gum. | 50 | 12.3 |

Tests described in Table IV made following the same procedures as above show that diatomaceous earth, talc and Microcel (calcium silicate) are equivalents for the perlite ingredient of the fluid loss composition as the primary plugging agents.

TABLE IV

| Aqueous Medium | Example 26 Water | Example 27 Gelled Water [1] | Example 28 Water | Example 29 Gelled Water [1] | Example 30 Water | Example 31 Gelled Water [1] |
|---|---|---|---|---|---|---|
| Total conc. Additive (lbs./gal.) | 50 | 50 | 50 | 50 | 50 | 50 |
| Primary plugging agent (lbs./1,000 gal.) | [1] 12.5 | [2] 12.5 | [3] 12.5 | [3] 12.5 | [4] 12.5 | [4] 12.5 |
| Starch (lbs./1,000 gal.) | 27.1 | 27.1 | 27.1 | 27.1 | 27.1 | 27.1 |
| Bentonite (lbs./1,000 gal.) | 6.25 | 6.25 | 6.25 | 6.25 | 6.25 | 6.25 |
| Guar gum (lbs./1,000 gal.) | 4.15 | 4.15 | 4.15 | 4.15 | 4.15 | 4.15 |
| Fluid Loss (cc./30 min.) | 20.0 | 15.2 | 35.4 | 18.8 | 19.4 | 18.3 |

[1] Fresh water containing 40 lbs./1,000 gal. guar gum.
[2] Diatomaceous earth.
[3] Calcium silicate.
[4] Talc.

Additional fluid loss tests were made following the above procedures using the same materials and conditions of Examples 5 and 11 above, except that an ethylene oxide polymer having a molecular weight of from five to six million was substituted for guar gum as the polymeric agent in the fluid loss additive. In fresh water (similar to Example 5) a fluid loss of 19.6 ml. in 30 minutes was obtained. When the concentration of ethylene oxide polymer was increased from 4.0 lbs./1000 gals. to 44 lbs./1000 gals., the fresh water fluid loss decreased to 14.9 ml. in 30 minutes. In gelled water (similar to Example 11) a fluid loss of 14.9 ml. in 30 minutes was obtained.

Field example

One specie of the fluid loss control additive of this invention was used in fracturing a well near Tonkawa, Okla., having a total depth of 4,349 feet, 90 of open hole and completed in the Mississippi chat formation. Previous stimulation treatment used on this well involved shooting the well with 90 quarts of nitroglycerine from 4,303 to 4,348 feet, water fracturing with 45,000 pounds sand and 30,000 gallons water and water fracturing again with 16,000 pounds sand and 16,000 gallons water. Both previous fracturing jobs sanded out, the first before half of the sand was put away, and resulting in negligible production increase. At the time of the treatment described below, the well was producing 5 to 6 BOPD and 50 BWPD.

The well was treated according to the process of this invention by carrying out the following steps:

(a) A salt plug was formed downhole to seal off the underlying water zone and old fractures in the surrounding formation by pumping down the casing 1,000 pounds rock salt suspended in enough water to make a pumpable slurry along with 1,000 gallons 15 percent hydrochloric acid solution containing 83.4 pounds ammonium bifluoride. The well was shut in 12 minutes to allow the salt plug to form.

(b) The pumping rate and pressure that could be expected with various fluids were determined by pumping down the casing first 100 barrels water and then 150 barrels water containing 50 pounds/1000 gallons fluid loss additive containing 48 parts by weight perlite, 115 parts starch, 57 parts bentonite and 20 parts guar gum. This additive is hereinafter referred to as Additive B.

(c) The well was fractured down the casing-tubing annulus using 8,500 gallons water gelled with 40 lbs./1000 gallons guar gum, 0.5 lb./gallon 20 to 40 mesh sand and 5 lbs./1000 gallons Additive B. During this stage, the pressure averaged about 1900 p.s.i. and the pumping rate averaged about 28 bbls./min.

(d) Lastly, a flush of 150 barrels salt water was pumped into the well. This volume provided an overflush of 50 barrels.

All of the above treating fluids contained, in addition to the materials specified, 1 gallon per 1000 gallons of a solution comprising 50 parts by weight alkyl benzyl trimethyl ammonium chloride wherein the alkyl groups contain from 10 to 14 carbon atoms, 30 parts water and 20 parts isopropanol. All fluids were batch mixed prior to injection. Pouring Additive B from bags into tanks of the fracturing fluid resulted in formation of less dust than is generally experienced in field mixing other finely divided particulate fluid loss additives. Production was observed for 9 days following the treatment and after that time appeared to have leveled off at about 17 BOPD and 155 BWPD.

From the foregoing description of the invention, it will be obvious to those skilled in the art that many variations and modifications may be made in the compositions and processes of this invention without departing from the spirit and scope thereof.

We claim:
1. A solid particulate, low fluid loss additive for aqueous fracturing media comprising:
   (a) about 100 to about 150 parts by weight of a low density particulate silicate material having two dimensions substantially greater than the third dimension selected from the class consisting of perlite and diatomaceous earth,
   (b) about 250 to about 350 parts starch, and
   (c) about 125 to about 175 parts water-swellable clay.
2. The composition of claim 1 wherein the water-swellable clay is bentonite.
3. An aqueous well fracturing composition comprising an aqueous base fracturing fluid and a mixture consisting of:
   (a) between 100 and 150 parts by weight of a low density solid silicate material selected from the class consisting of perlite and diatomaceous earth,
    (b) between 250 and 350 parts starch, and
    (c) between 125 and 175 parts by weight water-swellable clay,
in an amount of between 5 and 200 pounds of said mixture per 1000 gallons of said aqueous base fracturing fluid.

4. The composition of claim 3 wherein the water-swellable clay is bentonite.

5. The composition of claim 3 wherein the aqueous medium is gelled water.

6. The composition of claim 5 wherein the water is gelled with guar gum.

7. A solid particulate, low fluid loss additive for aqueous fracturing media comprising:
    (a) about 100 to about 150 parts by weight of a low density particulate silicate material having two dimensions substantially greater than the third dimension selected from the class consisting of perlite and diatomaceous earth,
    (b) about 250 to about 350 parts starch,
    (c) about 125 to about 175 parts water-swellable clay, and
    (d) about 0 to about 100 parts water-soluble gum.

8. The composition of claim 7 wherein the water-swellable clay is bentonite.

9. An aqueous well fracturing composition comprising an aqueous base fracturing fluid and a mixture consisting of:
    (a) between 100 and 150 parts by weight of a low density solid silicate material selected from the class consisting of perlite and diatomaceous earth,
    (b) between 250 and 350 parts by weight of starch,
    (c) between 125 and 175 parts by weight water-swellable clay, and
    (d) between 0 and 100 parts by weight water-soluble gum,
in an amount of between 5 and 200 pounds of said mixture per 1000 gallons of said aqueous base fracturing fluid.

10. A low liquid loss well-fracturing composition consisting of a major portion of water gelled with a water-soluble gum as a carrier and 5 to 200 pounds per 1000 gallons of said carrier of a solid particulate fluid loss additive mixture comprising 125 parts by weight perlite, 300 parts by weight starch, 150 parts by weight bentonite and 50 parts by weight guar gum.

11. In a process of fracturing a subterranean formation traversed by a well wherein an aqueous liquid is forced into the well bore under pressure, the method of sealing said formation against loss of appreciable amounts of said liquid to the formation which comprises incorporating in said liquid an additive comprsing 100 to 150 parts by weight of a primary plugging agent of a low density solid silicate material selected from the class consisting of perlite and diatomaceous earth, 250 to 350 parts by weight of a secondary plugging agent of a starch, 125 to 175 parts by weight of a tertiary plugging agent of a water-swellable clay, and 0 to 100 parts by weight of a water-soluble gum, said additive being present in a concentration of from 5 to 200 pounds per 1000 gallons aqueous liquid.

12. The process of claim 11 wherein the tertiary plugging agent is bentonite.

13. The process of claim 11 wherein the water-soluble gum is guar gum.

14. In the process of fracturing a formation penetrated by a well in which a gelled aqueous base fracturing fluid is injected into the well to fracture the formation and transport props into the fracture, the improvement comprising adding to said gelled aqueous base fracturing fluid a solid particulate liquid loss control additive comprising:
    (a) 100 to 150 parts by weight of a low density solid silicate material selected from the class consisting of perlite and diatomaceous earth,
    (b) 250 to 350 parts by weight of a starch,
    (c) 125 to 175 parts by weight of a water-swellable clay, and
    (d) 0 to 100 parts by weight of a water-soluble gum,
said additive being present in an amount of 5 to 200 pounds per 1000 gallons of said gelled aqueous base fracturing fluid.

References Cited

UNITED STATES PATENTS

| | | | |
|---|---|---|---|
| 2,683,690 | 7/1954 | Armentrout | 252—8.5 |
| 2,779,735 | 1/1957 | Brown et al. | 252—8.55 |
| 2,861,042 | 11/1958 | Watkins | 252—8.5 |
| 2,895,911 | 7/1959 | Van Dyke | 252—8.5 |
| 2,908,597 | 10/1959 | Owen | 252—8.5 |
| 3,079,332 | 2/1963 | Wyant | 252—8.55 |
| 3,081,260 | 3/1963 | Park | 252—8.5 |
| 3,153,450 | 10/1964 | Foster et al. | 252—8.55 |

HERBERT B. BUYNN, *Primary Examiner.*

LEON D. ROSDOL, *Assistant Examiner.*

UNITED STATES PATENT OFFICE
CERTIFICATE OF CORRECTION

Patent No. 3,408,296                                    October 29, 1968

David A. Kuhn et al.

It is certified that error appears in the above identified patent and that said Letters Patent are hereby corrected as shown below:

Column 2, line 12, cancel "ratios to provide suitable liquid loss chrcteristics for the". Column 4, line 36, "along" should read -- alone --. Column 5, line 5, "bentonte" should read -- bentonite --; same column 5, TABLE III, second column, lines 11 to 16 thereof, "do", each occurrence, should read -- 1% calcium chloride brine --; same column 5, line 64, "90 of open hole" should read -- 90 feet of open hole --. Columns 5 and 6, TABLE IV, second column, line 2 thereof, "$^{1}$12.5" should read -- $^{2}$12.5 --. Column 6, line 20, "5 lbs." should read -- 50 lbs. --.

Signed and sealed this 3rd day of March 1970.

(SEAL)
Attest:

Edward M. Fletcher, Jr.                             WILLIAM E. SCHUYLER, JR.
Attesting Officer                                           Commissioner of Patents